UNITED STATES PATENT OFFICE.

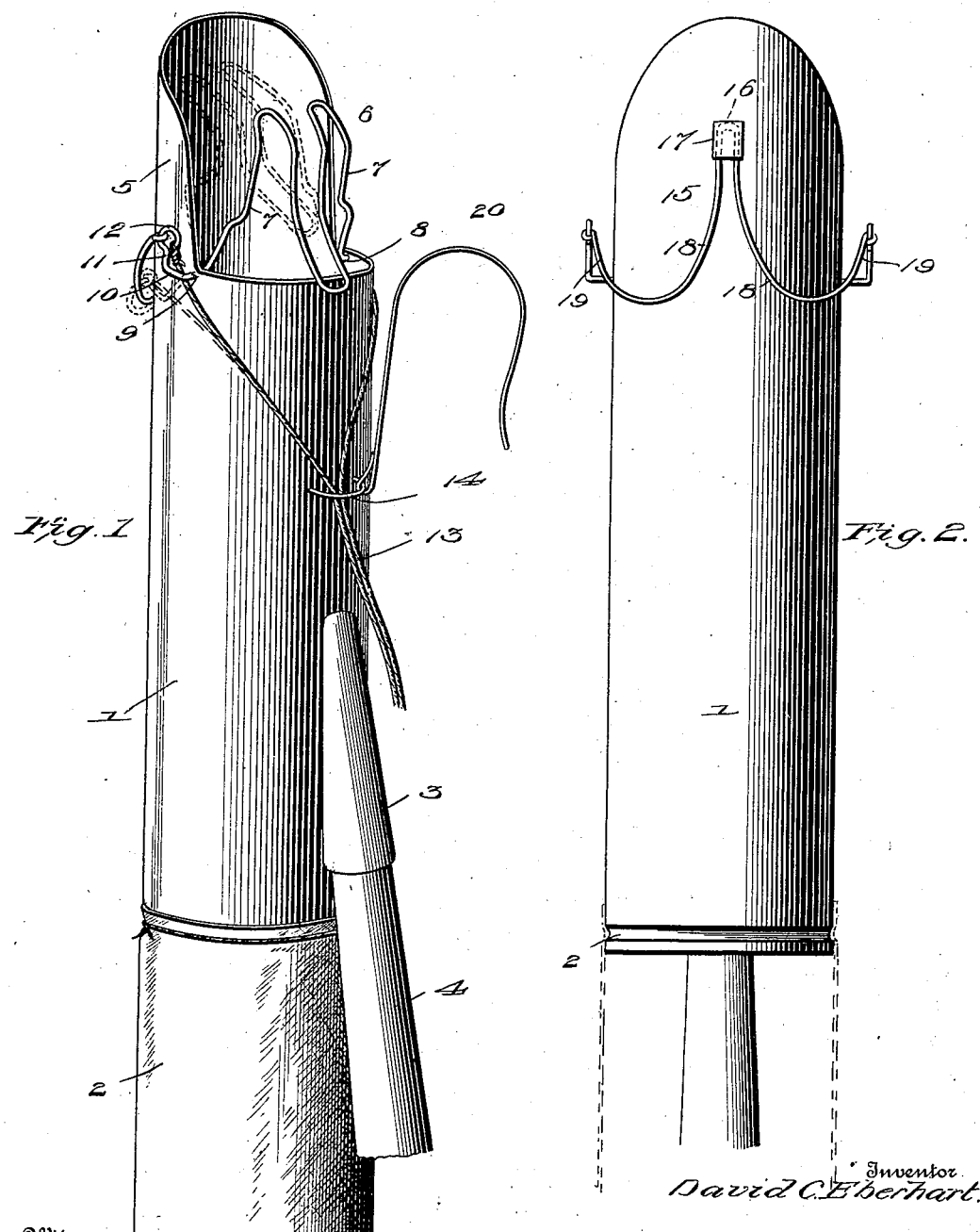

DAVID C. EBERHART, OF SHREWSBURY, PENNSYLVANIA.

FRUIT-PICKER.

SPECIFICATION forming part of Letters Patent No. 723,658, dated March 24, 1903.

Application filed February 4, 1902. Serial No. 92,545. (No model.)

*To all whom it may concern:*

Be it known that I, DAVID C. EBERHART, a citizen of the United States, residing at Shrewsbury, in the county of York and State of Pennsylvania, have invented new and useful Improvements in Fruit-Pickers, of which the following is a specification.

This invention relates to a fruit picker or gatherer of that class which is held by the operator standing on the ground surface or on a slightly-elevated platform; and the object of the same is to provide a simple and effective device which may be projected or disposed to gather fruit on the top of the highest branches of a tree and having means in connection therewith for severing the fruit in the event of resistance encountered through the toughness of the stems and to permit the fruit as it descends to be gently directed into a receptacle, and thereby materially facilitate picking or gathering fruit without injury to the same.

The invention consists in the construction and arrangement of the several parts, which will be more fully hereinafter described and claimed.

In the drawings, Figure 1 is a perspective view of a fruit-picker, showing the conveying-tube, handle, and operating-cord broken away and a part of the mechanism in dotted lines to show the operation thereof. Fig. 2 is a rear elevation of the upper portion of the picker.

Similar numerals of reference are employed to indicate corresponding parts in the views.

The numeral 1 designates an elongated head formed of suitable metal and having a lower circumferential grooved tube. This lower grooved end of the head 1 is fitted in the upper terminal 2, of suitable textile or other material and of such length as to depend to the ground surface or the surface of a platform on which the operator may stand to direct the fruit into a barrel or other depository. The head 1 also has a socket 3 extending downwardly therefrom at an outward angle of inclination and receives the upper end of a handle 4, which stands at a corresponding angle for convenience in operating the picker or gatherer. The said handle 4 will also be of such length as to permit the operator to project the head 1 upwardly to the highest portions of limbs or branches of a tree in performing the picking or gathering operation with the improved device.

The head 1 has its upper end cut away to provide a projecting gathering-lip 5, which will have a sharpened edge for use in severing the stems of the fruit, it being observed that the said lip is in a plane diametrically opposite the application of the handle 4 to the head 1, so that the fruit as severed will pass down over the said lip into the head and from the latter into the conveying-tube 2.

At the upper end of the head 1 and coöperating with the lip 5 is a picker 6, formed of a piece of stiff wire having a certain amount of resiliency and bent into shape to produce opposite looped arms 7, which continue into a central guard-loop 8, which normally projects over and bears against the upper edge of the head 1 at a point diametrically opposite the center of the lip 5. The outer members of the arms 7 depend to a point slightly below the points of intersection of the side edges of the lip 5 with the upper edge of the head 1 and are bent horizontally straight to form fulcrums 9, which are passed through the head, and from the said fulcrum the opposite members of the arms are continued into rearwardly-bent elements 10, with upstanding terminals 11, having eyes 12. To the eyes 12 the upper ends of pull-cords 13 are secured and are then directed to the front of the head 1 and are passed through a guard-loop 14, the said cords being of such length as to be within easy reach of the operator below. The picker 6 is normally held in the position shown by full lines in Fig. 1, and by pulling downwardly on the cords 14 said picker will be thrown rearwardly against or close to the lip 5, as shown by dotted lines. The function of the said picker is to release or separate the fruit-stems which offer a resistance to ready breakage or those stems to which the fruit firmly clings. In the use of this picker the head 1 is pushed upwardly until the fruit rests within the area of the lip 5, and the said picker is then pulled over into the position shown by dotted lines, so that the arms will be above the top portion of the fruit, the stem then passing into the guard-loop 8. When the picker is so positioned and the fruit disposed below the arms 7, a downward pull on the entire device will cause the said arms to detach the fruit, which will then fall through the head 1 and into the tube 2. To maintain the picker 6 in the normal position shown by Fig. 1, a spring 15 is employed, and consists of an upper looped end 16, firmly held by a clip-plate 17 against the rear side of the lip 5 at the center. From the loops 16 opposite curved arms 18 depend and terminally extend around and upwardly, as at 19, and have their ends secured to the eyes 12 of the elements 10, continuous with the arms 7 of the picker. When the cords 13 are operated to throw the picker over to the rear, as shown by dotted lines, the said picker moves against the resistance of the spring 15, constructed and arranged as set forth, and the said picker is held against a complete overthrow in a forward direction by the lower end of the guard-loop 8 bearing upon the upper edge of the head 1.

Where the fruit is thick and the gathering operation can be rapidly carried on by simply shifting or turning the head 1 at different angles within a given area, it is proposed to apply an attachment for relieving the operator of the tiresome weight and movement that would result from a continual uplifting or upward movement of the entire device. This attachment consists of a hook 20, which is loosely attached to the guard-loop 14 and is adapted to be placed over a limb or branch, and thereby support the greater portion of the weight of the device to permit the operator to move the head 1 at different angles without the inconvenience of elevating the entire device, as previously set forth.

The improved picker will be found exceptionally useful and save labor and time in picking or gathering fruit.

It is intended that the head 1 be constructed of such metal as to resist corrosion or be formed of a metal treated with a coating of non-corrosive material. The proportions and size of the various parts may also be modified at will, and in view of the few parts comprised in the construction of the device the cost of manufacture will be reduced to a minimum.

Having thus fully described the invention, what is claimed as new is—

1. A fruit picker or gatherer comprising a tubular head having a lip at the upper end thereof, a picker movably mounted adjacent to and coöperating with the said lip, the said picker being located below the plane of the upper edge of the lip and adapted to bear against the inner surface of the latter, means for conveying the fruit from the head and manipulating the latter, and means for operating the said picker.

2. A fruit picker or gatherer comprising a head having a projecting lip at its upper end disposed vertically within the confines of the said head, a spring-controlled picker coöperating with the said lip and having opposite looped arms with a space between them and continuing into a central guard-loop which normally bears upon the upper edge of the head, a pull device connected to the terminals of the picker and located on the exterior of the head, and means for conveying the fruit from the head and for supporting the latter.

In testimony whereof I affix my signature in presence of two witnesses.

DAVID C. EBERHART.

Witnesses:
JAMES GERRY,
L. E. BOESSER.